(12) United States Patent
Li et al.

(10) Patent No.: US 9,243,738 B2
(45) Date of Patent: Jan. 26, 2016

(54) OVERTURNING MACHINE AND WORKBENCH THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Shi-You Li, Shenzhen (CN); Yi-Jian Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/472,682

(22) Filed: Aug. 29, 2014

(65) Prior Publication Data

US 2015/0063964 A1    Mar. 5, 2015

(30) Foreign Application Priority Data

Aug. 29, 2013    (CN) ........................ 2013 1 03836190

(51) Int. Cl.
| | |
|---|---|
| B25B 5/14 | (2006.01) |
| F16M 11/18 | (2006.01) |
| B25B 5/16 | (2006.01) |
| B65H 9/10 | (2006.01) |
| B25J 9/16 | (2006.01) |
| B25B 5/06 | (2006.01) |
| B25J 9/00 | (2006.01) |

(52) U.S. Cl.
CPC .................. *F16M 11/18* (2013.01); *B25B 5/06* (2013.01); *B25B 5/145* (2013.01); *B25B 5/163* (2013.01); *B25J 9/0096* (2013.01); *B25J 9/1633* (2013.01); *B65H 9/101* (2013.01); *B25B 5/142* (2013.01)

(58) Field of Classification Search
CPC ......... B25J 9/1633; B65H 9/101; B25B 5/14; B25B 5/142; B25B 5/145; B25B 5/16; B25B 5/163; B25B 5/06; F16M 11/18
USPC .............. 414/589; 269/118; 298/311.2, 316.4
See application file for complete search history.

(56) References Cited

U.S. PATENT DOCUMENTS

| | | | |
|---|---|---|---|
| 2,460,679 A | * | 2/1949 | Clay .................................... 81/6 |
| 5,931,047 A | * | 8/1999 | Ellqvist et al. ............. 74/490.01 |
| 2011/0199113 A1 | * | 8/2011 | Lee ........................... 324/757.04 |

FOREIGN PATENT DOCUMENTS

JP     2009298570 A   *   12/2009

OTHER PUBLICATIONS

"3-in-1 Drill Press Upgrade", Aug. 2014, Home Publishing Co., WoodsmithPlans.com, SN12818, pp. 1-2,6.*

*Primary Examiner* — Gerald McClain
(74) *Attorney, Agent, or Firm* — Novak Druce Connolly Bove + Quigg LLP

(57) ABSTRACT

A machine to overturn workpieces can include a mechanical arm, a holding member coupled to the mechanical arm, and a workbench positioned adjacent to the mechanical arm. The workbench can include a base plate and a first positioning assembly. The base plate can define a slot. The slot can extend towards and through a sidewall of the base plate, and define an outlet at a portion running through the sidewall. The first positioning assembly can be positioned on the base plate adjacent to the slot. The first positioning assembly can be configured to manipulate and position the workpiece. The mechanical arm can be configured to drive the holding member through the slot to attach to and hold onto a surface of the workpiece facing the base plate, and move the workpiece away from the base plate via the outlet.

12 Claims, 3 Drawing Sheets

OVERTURNING MACHINE AND WORKBENCH THEREOF

FIELD

The present disclosure relates to workpiece handling.

BACKGROUND

When opposite sides of a workpiece are machined, an overturning machine must be used to turn the workpiece over.

BRIEF DESCRIPTION OF THE DRAWINGS

Implementations of the present technology will now be described, by way of example only, with reference to the attached figures.

DETAILED DESCRIPTION

Figure 1:
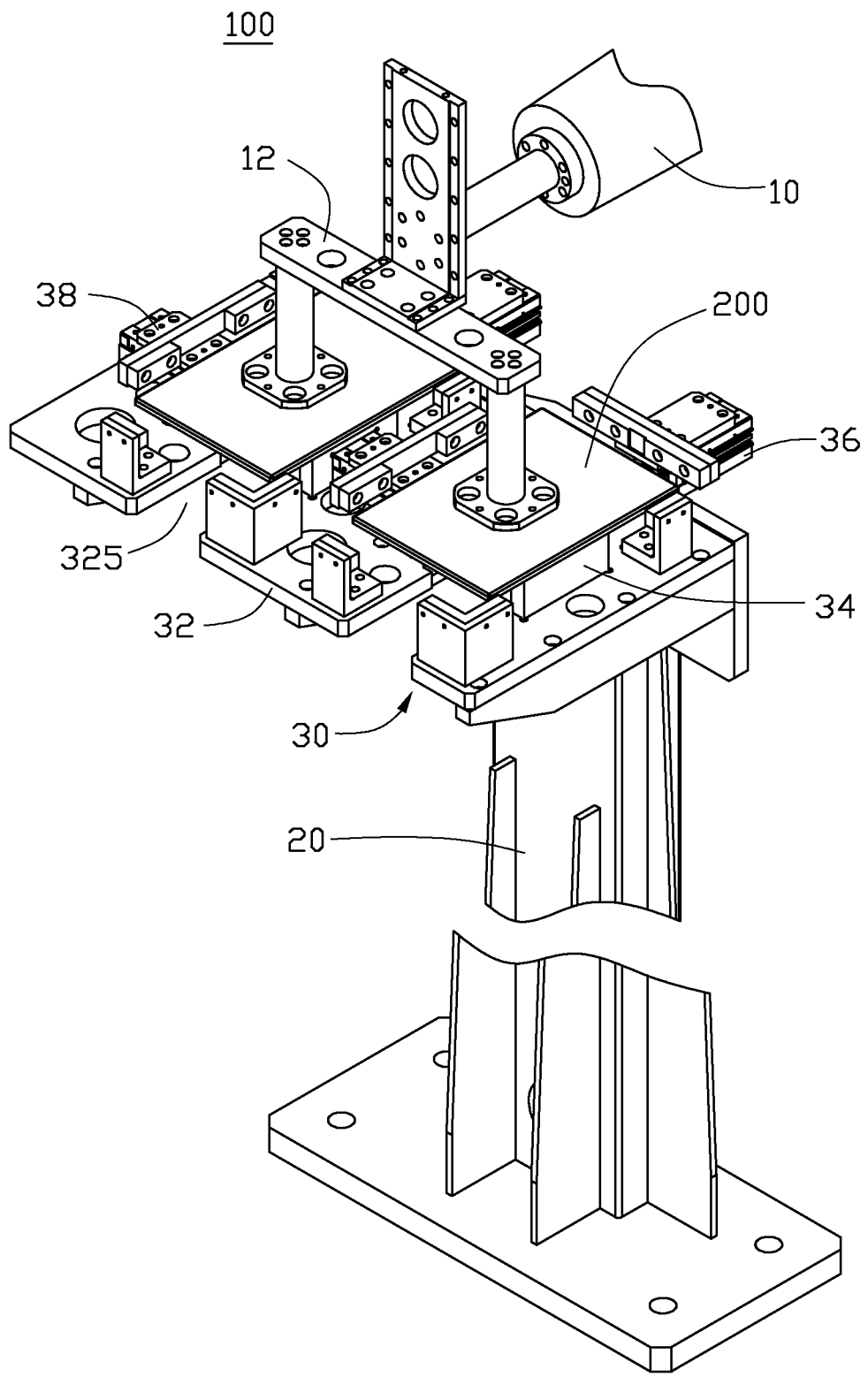
FIG. 1 is an isometric view of an embodiment of an overturning machine and workbench, the overturning machine having a mechanical arm.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series, and the like.

The present disclosure is described in relation to overturning machine and workbench.

An overturning machine can include a mechanical arm, a holding member coupled to the mechanical arm, and a workbench positioned adjacent to the mechanical arm. The workbench can include a base plate and at least one first positioning assembly. The base plate can include a top surface configured to support a workpiece, and a bottom surface opposite to the top surface. The base plate can define at least one slot. The at least one slot can extend through the top surface and the bottom surface. The at least one slot can further extend towards and through a sidewall of the base plate, and define an outlet at a portion running through the sidewall. The at least one first positioning assembly can be located on the top surface and adjacent to the slot. The at least one first positioning assembly can be configured to manipulate and position the workpiece. The mechanical arm can be configured to drive the holding member through the at least one slot to releasably attach to a surface of the workpiece facing the base plate, and move the workpiece in a direction away from the base plate via the outlet.

FIG. 1 illustrates an embodiment of an overturning machine 100 arranged between two processing stations (not shown). The overturning machine 100 can be configured to catch and turn a workpiece 200 over from a first processing station (not shown), and position the workpiece 200 on a second processing station (not shown). The workpiece 200 can include a first surface (not labeled) and a second surface (not labeled) opposite to the first surface.

The overturning machine 100 can include a mechanical arm 10, a holding member 12 coupled to the mechanical arm 10, a bracket 20 adjacent to the mechanical arm 10, and a workbench 30 positioned on the bracket 20.

In the illustrated embodiment, the holding member 12 can be a vacuum chuck. The holding member 12 can be mounted at an end of the mechanical arm 10. The mechanical arm 10 can be configured to move the holding member 12 to vacuum-lift the first surface of the workpiece 200 in the first processing station, and position the workpiece 200 on the workbench 30, and then the mechanical arm 10 can drive the holding member 12 to vacuum-lift the second surface of the workpiece 200 and move the workpiece 200 to the second processing station. In an alternative embodiment, the holding member 12 can be other holding structures, such as but not being limited to, a clamp, or a magnetic device, such that the holding member 12 can catch and hold the workpiece 200.

Figure 2:
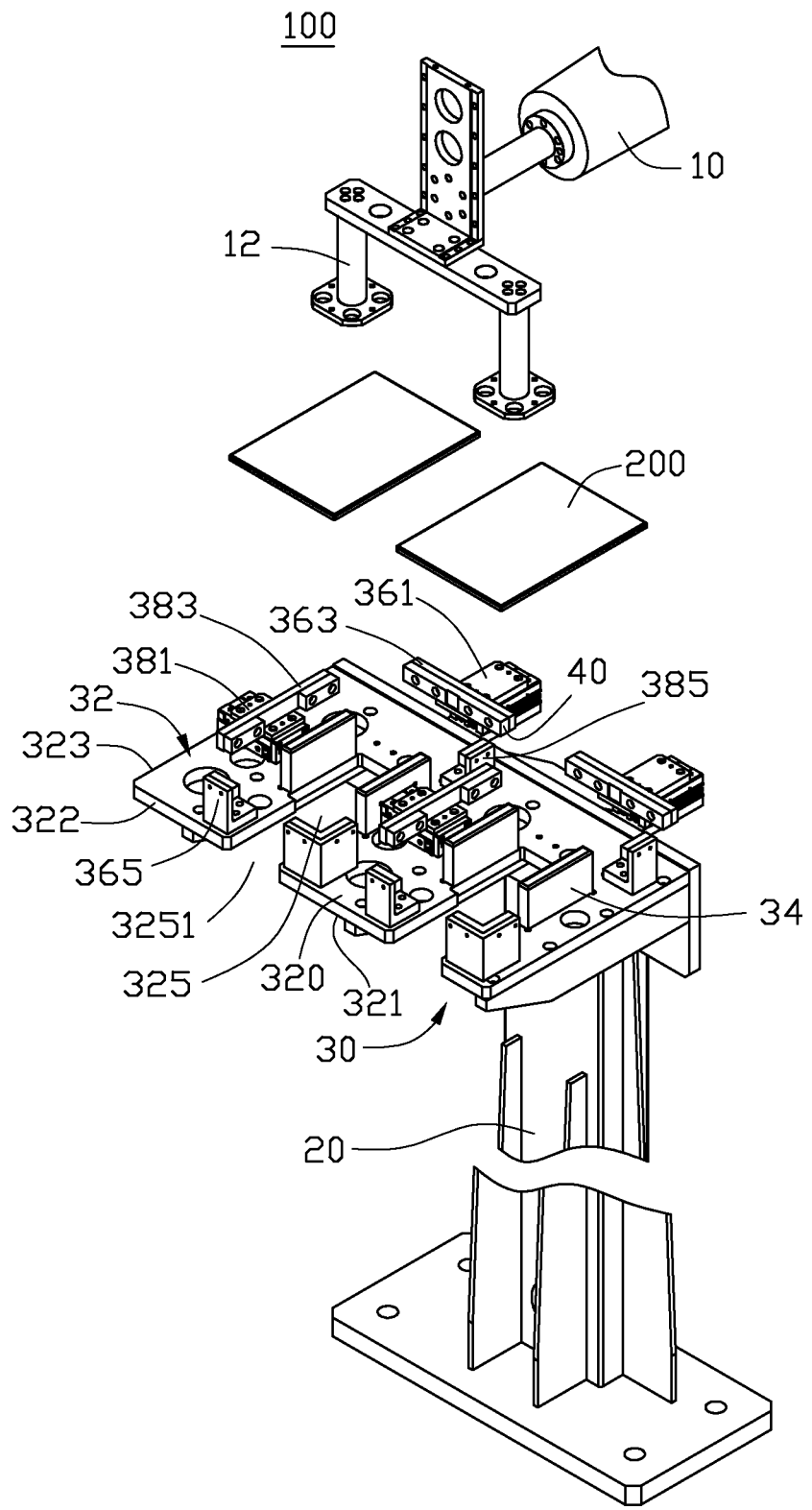
FIG. 2 is an exploded, isometric view of the overturning machine and workbench of FIG. 1, the mechanical arm shown in a first position.

Referring to FIG. 2, the bracket can be positioned in a working environment adjacent to the mechanical arm 10.

The workbench 30 can include a base plate 32, a plurality of supporting members 34, at least one first positioning assembly 36, and at least one second positioning assembly 38. A side of the base plate 32 can be coupled to the bracket 20, such that the base plate 32 can be substantially perpendicular to the bracket 20. The supporting members 34, the at least one first positioning assembly 36, and the at least one second positioning assembly 38 can be mounted on the base plate 32.

The base plate 32 can be substantially a rectangular plate, and can include a top surface 320, a bottom surface 321, a first sidewall 322, and a second sidewall 323. The top surface 320 and the bottom sidewall 321 can be parallel. The first sidewall 322 and the second sidewall 323 can be perpendicular and coupled to each other. The first sidewall 322 can be away from the bracket 20, and coupled to the top surface 320 and the bottom surface 321. The base plate 32 can define at least one slot 325 thereon. The at least one slot 325 can extend through the top surface 320 and the bottom surface 321, and can extend towards and through the first sidewall 322 along a direction perpendicular to the first sidewall 322. The at least one slot 325 can define an outlet 3251 at a portion running through the first sidewall 322. In the illustrated embodiment, there can be two slots 325. The two slots 325 can be parallel to each other, such that the base plate 32 can be substantially E-shaped. The workpiece 200 can be positioned on the base plate 32 above the slots 325. The holding member 12 can be inserted through the slots 325 to attach to a surface of the workpiece adjacent to the base plate 32, and can move the workpiece 200 away from the base plate 32 via the outlet 3251. In an alternative embodiment, the quantity of the slots 325 can be several.

Each of the plurality of supporting members 34 can be substantially a rectangular block, and can be positioned on the base plate 32 parallel to the second sidewall 323. The supporting members 34 can be configured to support the workpiece 200. In the illustrated embodiment, there can be four supporting members 34. Two of the supporting members 34 can be positioned at opposite sides of one slot 325 and can be perpendicular to the base plate 32. Another two supporting members 34 can be positioned at opposite sides of another slot 325 and can be perpendicular to the base plate 32. The supporting member 34 can be made of resilient but rigid material, such as but not being limited to, bakelite, such that the workpiece 200 can be protected from scrapes.

Each of the at least one first positioning assemblies 36 can include a first driver 361, a first pushing member 363, and two first stopping members 365. The first driver 361 can be mounted at a side of the top surface 320 away from the first sidewall 322 corresponding to one of the slots 325, and away from the outlet 3251. The first pushing member 363 can be coupled to the first driver 361 and adjacent to the slot 325. The first stopping members 365 can be positioned on a side of the top surface 320 adjacent to the first sidewall 322. The two first stopping members 365 can be positioned at opposite sides of the outlet 3251 of the slot 325 and parallel to the first sidewall 322. The two first stopping members 365 can be opposite to the first driver 361 and the first pushing member 363. The first driver 361 can be configured to move the first pushing member 363 towards the first stopping members 365, thereby pushing the workpiece 200 against the supporting members 34 to resist against the first stopping members 365, such that the workpiece 200 is positioned along a first direction perpendicular to the first sidewall 322.

Each of the at least one second positioning assemblies 38 can include a second driver 381, a second pushing member 383, and two second stopping members 385. The second driver 381 can be mounted on a side of the top surface 320 adjacent to the second sidewall 323. The second pushing member 383 can be coupled to the second driver 381 adjacent to one of the slots 325. The second stopping members 385 can be mounted on the top surface 320 and parallel to the second sidewall 323. The second stopping members 385 can be positioned at a side of a slot 325 away from the second sidewall 323. The second driver 381 can be configured to move the second pushing member 383 towards the second stopping members 385, thereby pushing the workpiece 200 against the supporting members 34 to resist against the second stopping members 385, such that the workpiece 200 is positioned along a second direction perpendicular to the second sidewall 323. In the illustrated embodiment, there can be two first positioning assemblies 36 and two second positioning assemblies 38. The two first positioning assemblies 36 can be positioned on the base plate 32 to correspond to the two slots 325. The two second positioning assemblies 38 can be positioned on the base plate 32 to correspond to the two slots 325, to enable the workbench 30 to handle two workpieces 200 at one time. In an alternative embodiment, the respective quantities of the slots 325, the first positioning assemblies 36, and the second positioning assemblies 38 can be several.

The first pushing members 363, the first stopping members 365, the second pushing members 383, and the second stopping members 385 can provide cushions 40 at surfaces facing the slots 325. The cushions 40 can be made of shock-absorbing materials, such as but not being limited to, foam, rubber, or soft plastic. In an alternative embodiment, the cushions 40 can be made of resilient but rigid material, such as but not being limited to, bakelite, such that the workpiece 200 can be protected from being scraped. When the first and second positioning assemblies 36 and 38 position and keep pressing against the workpieces 200, the cushions 40 can buffer the force applied to the workpieces 200. In an alternative embodiment, the cushions 40 can be omitted.

Figure 3:
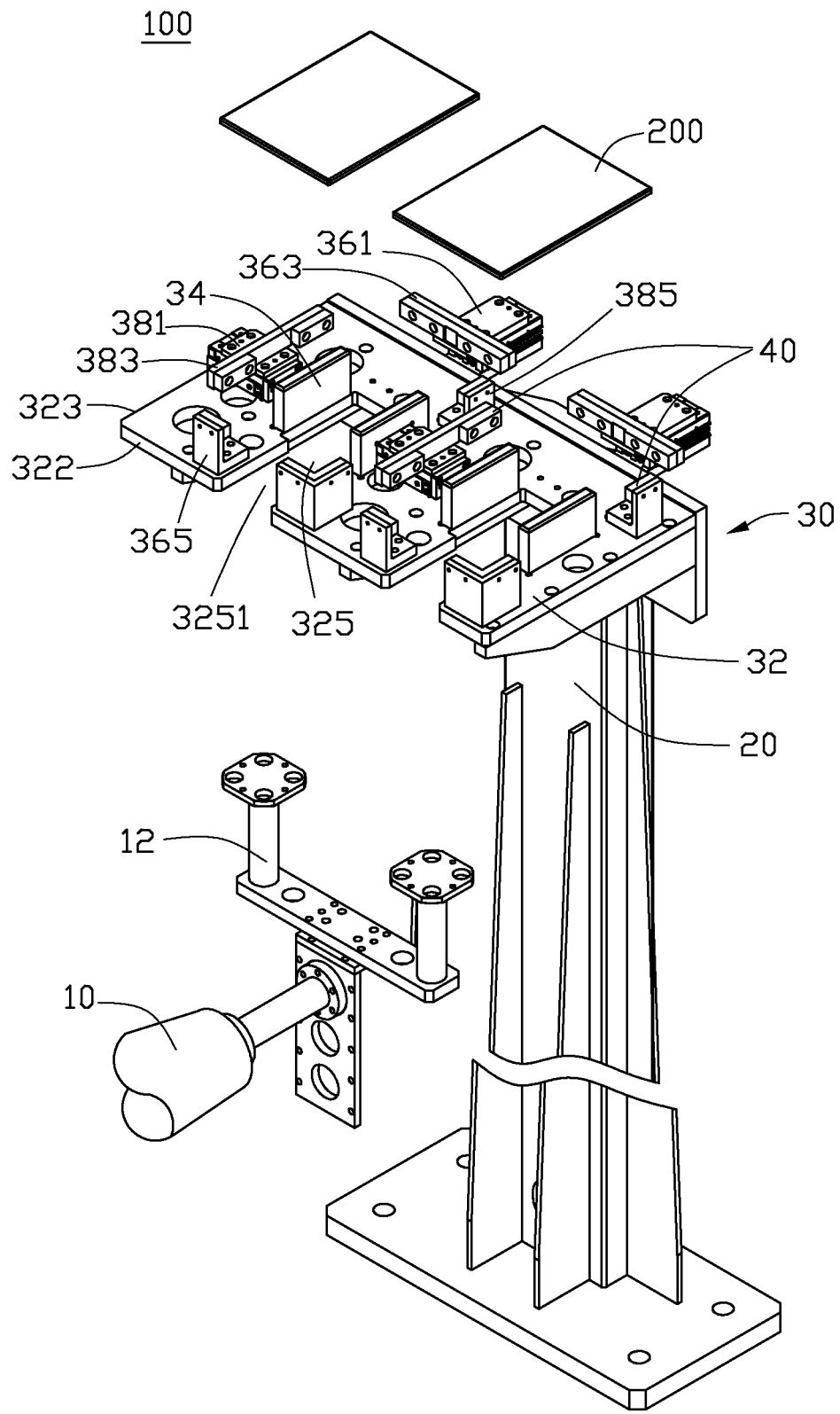
FIG. 3 is an exploded, isometric view of the overturning machine and workbench of FIG. 1, the mechanical arm shown in a second position.

Referring to FIG. 3, in operation, the mechanical arm 10 can move the holding member 12 to vacuum-lift the first surface of the workpieces 200 in the first processing station, and position the workpiece 200 on the supporting members 32. The holding member 12 can release the workpieces 200 and the workpieces 200 can be positioned over the slots 325. The first surfaces of the workpieces 200 can face away from the base plate 32, and the second surfaces of the workpieces 200 can face the base plate 32. The first drivers 361 can move the first pushing members 363 to push the workpieces 200 towards and be resisted against the first stopping members 365, to position the workpieces 200 along the first direction. The first drivers 361 can drive the first pushing members 363 to move back. The second drivers 381 can move the second pushing members 383 to push the workpieces 200 towards and be resisted against the second stopping members 385, to position the workpieces 200 along the second direction. The second drivers 361 can drive the second pushing members 363 to move back. The first and the second drivers 361 and 381 can drive the first and the second pushing members 363 and 383 to move towards and keep pressure against the workpieces 200 simultaneously. The mechanical arm 10 can drive the holding member 12 through the slots 325 to attach to the second surface of the workpiece facing the base plate 32. The first and the second drivers 361 and 381 can drive the first and the second pushing members 363 and 383 to release the workpieces 200 and move back. The mechanical arm 10 can drive the holding member 12 to move the workpiece 200 away from the base plate 32 via the outlet 3251, and position the workpieces 200 on the second processing station.

In an alternative embodiment, the bracket 20 can be omitted. The workbench 30 can then be mounted on other member or directly mounted in the working environment, such as but not being limited to, the wall or a processing machine. The holding member 12 must be capable of being driven through and to move out from the slots 325.

In an alternative embodiment, the supporting members 34 can be omitted. The workpieces 200 can then be positioned directly on the base plate 32, and can be above the slots 325. The holding member 12 must be capable of being inserted through the slots 325 to attach and vacuum-lift the workpieces 200.

In an alternative embodiment, the first and second positioning assemblies 36 and 38 can be other structures. For example, there can be two positioning pins configured to position the workpiece 200 along two different directions. The workpiece 200 must be capable of being positioned on the base plate 32 to correspond to the slot 3251.

In an alternative embodiment, the first and second positioning assemblies 36 and 38 can be omitted.

The embodiments shown and described above are only examples. Many details are often found in the art such as the other features of an overturning machine and workbench. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

The invention claimed is:

1. An overturning machine comprising:
a mechanical arm;
a holding member coupled to the mechanical arm; and
a workbench adjacent to the mechanical arm, the workbench comprising:
   a base plate including:
      a top surface configured to support a workpiece; and
      a bottom surface opposite to the top surface; wherein the base plate has at least one slot; the at least one slot extends through the top surface and the bottom surface; the at least one slot further extends towards and through a sidewall of the base plate, and has an outlet at a portion running through the sidewall; and
   at least one first positioning assembly located on the top surface and adjacent to the slot; wherein the at least one first positioning assembly is configured to manipulate and position the workpiece; the mechanical arm is configured to drive the holding member through the at least one slot to releasably attach to a surface of the workpiece facing the base plate, and move the workpiece in a direction away from the base plate via the slot.

2. The overturning machine of claim 1, wherein the overturning machine further comprises a bracket; and the base plate is mounted to the bracket.

3. A workbench configured to cooperate with and assist a holding member coupled to a mechanical arm to convey and turn a workpiece over, the workbench comprising:
a base plate inlcuding:
   a top surface configured to support a workpiece; and
   a bottom surface opposite to the top surface; wherein the base plate has at least one slot; the at least one slot extends through the top surface and the bottom surface; the at least one slot further extends towards and through a sidewall of the base plate, and has an outlet at a portion running through the sidewall; and
at least one first positioning assembly located on the top surface and adjacent to the slot; wherein the at least one first positioning assembly is configured to manipulate and position the workpiece; the holding member is configured to be inserted through the at least one slot to releasably attach to a surface of the workpiece facing the base plate, and move the workpiece in a direction away from the base plate via the outlet.

4. The workbench of claim 3, wherein the at least one first positioning assembly comprises a first driver, a first pushing member, and at least one first stopping members;
the first driver is positioned on the base plate and at a side of the at least one slot away from the outlet; the first pushing member is coupled to the first driver and adjacent to the slot; the first stopping member is positioned on the base plate oppositely to the first pushing member, and adjacent to the outlet.

5. The workbench of claim 4, wherein the first pushing members and the first stopping members provides cushions at surfaces facing the at least one slot.

6. The workbench of claim 5, wherein the cushions are made of resilient material.

7. The workbench of claim 4, wherein the workbench further comprising at least one second positioning assembly positioned on the base plate; the at least one second positioning assembly is configured to position the workpiece.

8. The workbench of claim 7, wherein the at least one second positioning assembly comprises a second driver, a second pushing member, and at least one second stopping members; the second driver is positioned at a side of the at least one slot; the second pushing member is coupled to the second driver and adjacent to the slot; the second stopping member is positioned on the base plate oppositely to the second pushing member.

9. The workbench of claim 8, wherein the second pushing members and the second stopping members provides cushions at surfaces facing the at least one slot.

10. The workbench of claim 9, wherein the cushions is made of resilient material.

11. The workbench of claim 3, wherein the workbench further comprising a plurality of supporting members positioned on the base plate; the supporting members are positioned at opposite sides of the at least one slot and configured to support the workpiece.

12. The workbench of claim 11, wherein supporting members are made of bakelite.

\* \* \* \* \*